UNITED STATES PATENT OFFICE.

JUDSON A. DE CEW, OF MONTREAL, QUEBEC, CANADA.

TOXIC PRODUCT AND METHOD OF MAKING SAME.

1,155,708. Specification of Letters Patent. Patented Oct. 5, 1915.

No Drawing. Application filed February 25, 1914. Serial No. 820,956.

*To all whom it may concern:*

Be it known that I, JUDSON A. DE CEW, a subject of the King of Great Britain, and resident of the city of Montreal, in the Province of Quebec and Dominion of Canada, have invented certain new and useful Improvements in Toxic Products and Methods of Making Same, of which the following is a full, clear, and exact description.

This invention relates to a new and useful material particularly adapted for the preservation or impregnation of wood and like fibro-cellular material.

The poisonous and germicidal properties of arsenic are well known, and it is also known that the only real soluble forms of arsenic are the compounds of arsenic with soluble alkalis. Although these materials are strongly poisonous, it is apparent that they are not suitable for the impregnation of wood because of the free alkali having an injurious effect upon the fibro-cellular material.

My invention consists essentially in the discovery of a new product which is a soluble arsenical compound that is not definitely alkaline. In obtaining this product, I make use of certain properties existing in the organic or colloidal matter present in waste sulfite liquor from pulp mills. These materials have the property of uniting under certain conditions with a metallic base, and will hold it in solution when neutral or slightly acid.

My method of producing this arsenical compound is as follows:—To the waste sulfite liquors recovered from pulp mills, I add a soluble arsenical compound, such as sodium arsenite or any solution of arsenic in a soluble alkali. The resultant product obtained is an alkaline arsenical compound with the sulfo-organic material present. The quantity of arsenic introduced into the mixture depends on the toxic effect desired. This product would be suitable as a preservative material for wood if it did not have the alkaline characteristics of arsenical solutions. In order to remove the alkaline property of the compound, I neutralize the material with an acid or make the product so slightly acid in character that the excess of acid used would not be injurious for the purpose desired. After removing the alkalinity, the arsenic is not thrown down as it would be if the sodium arsenite were neutralized, but it is held in combination with the organic matter of the waste liquor as a soluble product.

I therefore have a soluble arsenical compound which is not alkaline in character, and which is suitable for impregnating wood or can be used for any other purpose where toxic materials are required. This product may be prepared during the concentration of the waste sulfite liquor, or the arsenical compound may be added to the concentrated product after its preparation. Various oils which are used in making wood preserving compounds may be incorporated into this product while in its concentrated condition.

Having thus described my invention, what I claim is:—

1. A product consisting of a non-alkaline arsenical compound of the organic colloidal materials of waste sulfite liquor.

2. A product consisting of an arsenical compound of the organic materials of waste sulfite liquor, which is slightly acid in character.

3. A product consisting of an arsenical compound with the organic material of waste sulfite liquor combined with oil.

4. A process of preparing an arsenical compound, which consists in adding an alkaline arsenical compound to waste sulfite liquor, and then neutralizing the product.

5. A process of making an arsenical compound, which consists in adding an alkaline arsenical compound to the organic matter of waste sulfite liquor, and then rendering the compound slightly acid in character.

In witness whereof, I have hereunto set my hand, in the presence of two witnesses.

JUDSON A. DE CEW.

Witnesses:
C. W. TAYLOR,
G. M. MORELAND.